US008339396B2

(12) United States Patent
Williams et al.

(10) Patent No.: US 8,339,396 B2
(45) Date of Patent: Dec. 25, 2012

(54) COARSENING AND SPLITTING TECHNIQUES

(75) Inventors: Michael John Williams, Ely (GB); Stephen Richard George Flew, Swansea (GB); Sigurdur Vidar Jonsson, Jericho (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 965 days.

(21) Appl. No.: 12/398,253

(22) Filed: Mar. 5, 2009

(65) Prior Publication Data

US 2010/0228527 A1 Sep. 9, 2010

(51) Int. Cl.
*G06T 15/00* (2011.01)
(52) U.S. Cl. ............... 345/420; 345/419; 703/2; 703/4; 703/6; 703/9; 703/10
(58) Field of Classification Search .................. 345/419, 345/420; 703/2, 4, 6, 9, 10
See application file for complete search history.

(56) References Cited

U.S. PATENT DOCUMENTS

| | | | |
|---|---|---|---|
| 6,106,561 A | 8/2000 | Farmer | |
| 6,230,101 B1 | 5/2001 | Wallis | |
| 6,388,947 B1 | 5/2002 | Washbourne et al. | |
| 6,693,631 B2 | 2/2004 | Hubeli et al. | |
| 6,823,297 B2 | 11/2004 | Jenny et al. | |
| 6,912,491 B1 | 6/2005 | Van Bemmel | |
| 7,248,259 B2 | 7/2007 | Fremming | |
| 7,584,086 B2 * | 9/2009 | Frankel | 703/10 |
| 7,716,028 B2 * | 5/2010 | Montaron et al. | 703/10 |
| 7,716,029 B2 * | 5/2010 | Couet et al. | 703/10 |
| 7,844,430 B2 * | 11/2010 | Landis et al. | 703/10 |
| 7,933,750 B2 * | 4/2011 | Morton et al. | 703/2 |
| 7,983,883 B2 * | 7/2011 | Chen et al. | 703/6 |
| 8,140,310 B2 * | 3/2012 | Fitzpatrick et al. | 703/10 |
| 2003/0216897 A1 | 11/2003 | Endres et al. | |
| 2004/0199329 A1 | 10/2004 | Stone | |
| 2005/0015231 A1 | 1/2005 | Edwards et al. | |
| 2005/0115711 A1 | 6/2005 | Williams et al. | |
| 2006/0265204 A1 | 11/2006 | Wallis et al. | |
| 2007/0010979 A1 | 1/2007 | Wallis et al. | |
| 2008/0040086 A1 | 2/2008 | Betancourt et al. | |
| 2008/0120076 A1 | 5/2008 | Thambynayagam et al. | |
| 2008/0255816 A1 | 10/2008 | Neville | |

OTHER PUBLICATIONS

White, Christopher D. et al., "Identifying and Estimating Significant Geologic Parameters With Experimental Design," SPE Journal, Sep. 2001, pp. 311-324.
Schlumberger, "Ocean for Petrel 2007.2 release", 2007 , pp. 1-17.
Schlumberger, "Petrel 2009—What's New," 2008, pp. 1-4.
King, Michael J. et al., "Optimal Coarsening of 3D Reservoir Models for Flow Simulation," SPE International, 2005 SPE Annual Technical Conference and Exhibition, Oct. 9-12, 2005, pp. 1-15, SPE 95759, Dallas, Texas USA.

(Continued)

*Primary Examiner* — Phu K Nguyen

(57) ABSTRACT

Disclosed herein are improved coarsening and splitting techniques for preparing grids for performing simulations. In some implementations, methods in accordance with the present disclosure may include providing a grid having a plurality of grid pillars; and performing one or more splitting operations on at least a portion of the grid to increase a grid density within the portion of the grid, the plurality of grid pillars within the portion of the grid being forced to remain fixed in position during the one or more splitting operations.

20 Claims, 7 Drawing Sheets

OTHER PUBLICATIONS

Schlumberger, "Petrel," Petrel seismic-to-simulation software, Version 2007.1, Petrel VR Configuratin and user guide, 2000-2007, pp. 1-33.

United Kingdom Cabinet Office, "Archiving Geological and Reservoir Simulation Models—A Consultation Document", 2005, pp. 1-11.

Webb, et al, "Enabling the "Big Loop" Consistent Geological and Simulation Models", Roxar Maxiumum Reservoir Performance, AAPG Technical Conference and Exhibition, Long Beach, California, USA, Apr. 4, 2007.

* cited by examiner

COARSENING AND SPLITTING TECHNIQUES

CROSS-REFERENCE TO RELATED APPLICATIONS

This patent application is related to co-pending, commonly-owned U.S. Patent Application entitled "Right Sizing Reservoir Models" filed concurrently herewith on Mar. 5, 2009 under application Ser. No. 12/398,294, which application is incorporated herein by reference.

BACKGROUND

Reservoir models, which may be used to predict fluid flow as well as hydrocarbon in place, can be built at a variety of scales, or cell sizes. Typically, a relatively "fine scale" model may be built in a geological modeling package, and may consist of many millions of cells. This model may then be "upscaled" to a relatively "coarse scale" model for use in, for example, dynamic reservoir simulation packages.

Using conventional techniques, however, there is a possibility that some of the coarsened grid cells may initially be defined by one or more complex quadrilaterals, causing so-called "self-intersecting" or "inside-out" cells. Such self-intersecting (or inside-out) cells make no sense to reservoir simulation models and typically cause simulation errors or failures. Identification and removal of inside-out cells typically requires time-consuming and expensive manual activities. In addition, using conventional techniques, the resulting coarsened grid may not be comparable to the underlying fine grid on a node-by-node basis, such that a comparison of simulation results on a coarse grid versus on the underlying fine grid is only at best approximate. Therefore, although desirable results have been achieved using such conventional techniques, there is room for improvement.

BRIEF DESCRIPTION OF THE DRAWINGS

Various embodiments and aspects of the present disclosure may be described below with reference to the accompanying figures, in which the same or similar reference numbers may be used to reference like features and components.

DETAILED DESCRIPTION

Disclosed herein are improved techniques for grid coarsening and splitting for producing grids suitable for performing computational simulations. Embodiments of systems and methods in accordance with the present disclosure may advantageously mitigate at least some undesirable aspects of conventional grid coarsening methods by reducing or eliminating possible occurrences of "self-intersecting" or "inside-out" cells, and by providing coarsened grid models wherein simulation results may be compared on a node-by-node basis. Thus, embodiments in accordance with the present disclosure may reduce labor costs associated with performing simulations (e.g. reservoir simulations), and may greatly facilitate comparison of simulation results on a coarse grid versus on the underlying fine grid.

More specifically, in some implementations, systems and methods in accordance with the present disclosure may include providing a grid having a plurality of grid pillars, and performing one or more splitting operations on at least a portion of the grid to increase a grid density within the portion of the grid. The plurality of grid pillars within the portion of the grid subject to the one or more splitting operations may be forced to remain fixed in position during the one or more splitting operations. These and additional aspects of implementations in accordance with the present disclosure are described more fully below.

Figure 1:
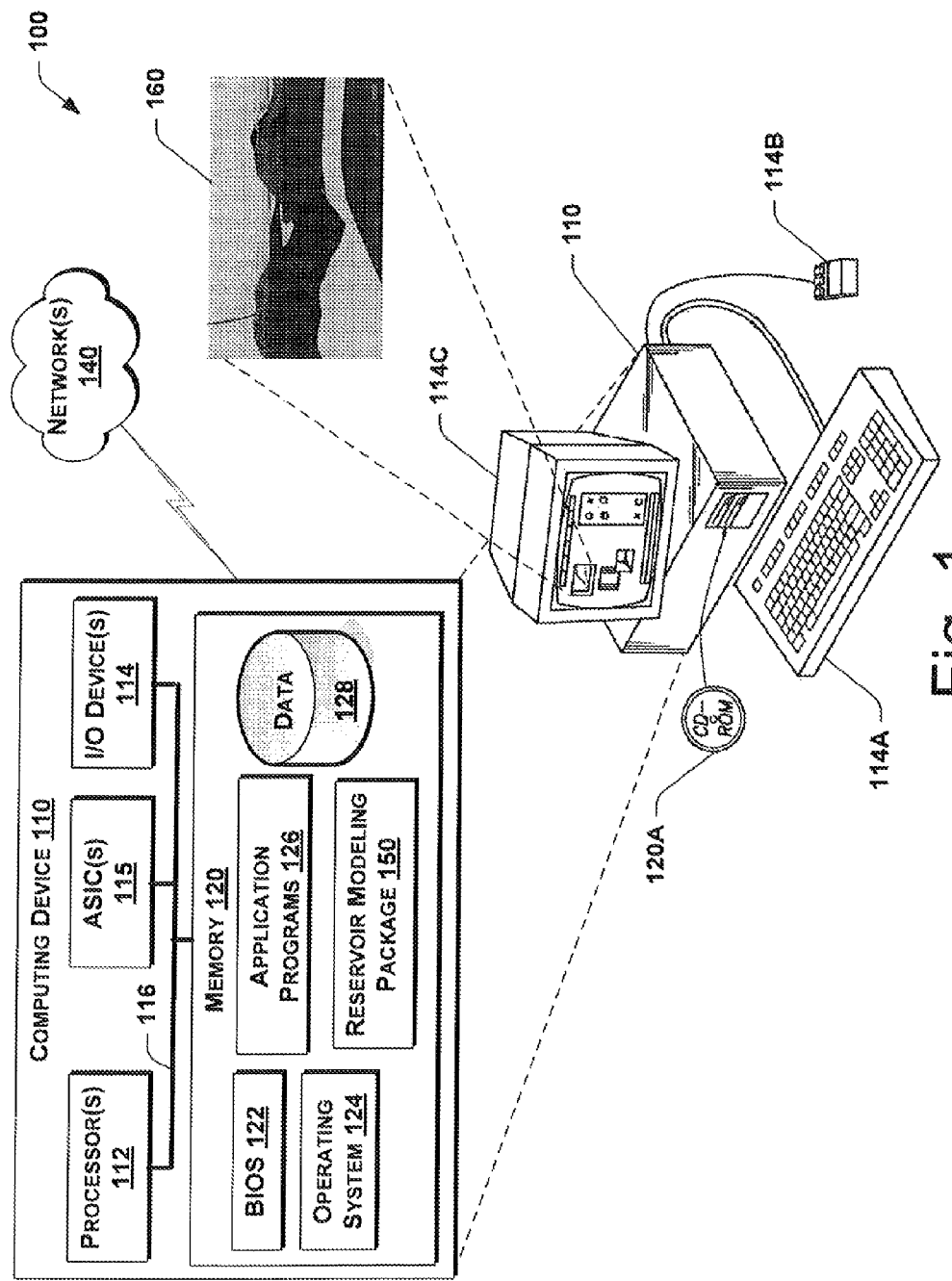
FIG. 1 illustrates an exemplary environment in which various embodiments of systems and methods in accordance with the teachings of the present disclosure can be implemented.

Systems and methods for coarsening and splitting grids in accordance with the teachings of the present disclosure may be implemented in a variety of computational environments. For example, FIG. 1 illustrates an exemplary environment 100 in which various embodiments of systems and methods in accordance with the teachings of the present disclosure can be implemented. In this implementation, the environment 100 includes a computing device 110 configured in accordance with the teachings of the present disclosure. In some embodiments, the computing device 110 may include one or more processors 112 and one or more input/output (I/O) devices 114 coupled to a memory 120 by a bus 116. One or more Application Specific Integrated Circuits (ASICs) 115 may be coupled to the bus 116 and configured to perform one or more desired functionalities described herein.

The one or more processors 112 may be composed of any suitable combination of hardware, software, or firmware to provide the desired functionality described herein. Similarly, the I/O devices 114 may include any suitable I/O devices, including, for example, a keyboard 114A, a cursor control device (e.g. mouse 114B), a display device (or monitor) 114C, a microphone, a scanner, a speaker, a printer, a network card, or any other suitable I/O device. In some embodiments, one or more of the I/O components 114 may be configured to operatively communicate with one or more external networks 140, such as a cellular telephone network, a satellite network, an information network (e.g. Internet, intranet, cellular network, cable network, fiber optic network, LAN, WAN, etc.), an infrared or radio wave communication network, or any other suitable network. The system bus 116 of the computing device 110 may represent any of the several types of bus structures (or combinations of bus structures), including a memory bus or memory controller, a peripheral bus, an accelerated graphics port, and a processor or local bus using any of a variety of bus architectures.

The memory 120 may include one or more computer-readable media configured to store data and/or program modules for implementing the techniques disclosed herein. For example, the memory 120 may host (or store) a basic input/output system (BIOS) 122, an operating system 124, one or more application programs 126, and program data 128 that can be accessed by the processor 112 for performing various functions disclosed herein.

The computing device 110 may further include a reservoir modeling package 150 in accordance with the teachings of the present disclosure. As depicted in FIG. 1, the reservoir modeling package 150 may be stored within (or hosted by) the memory 120. In alternate implementations, however, the reservoir modeling package 150 may reside within or be distributed among one or more other components or portions of the computing device 110. For example, in some implementations, one or more aspects of the reservoir modeling functionality described herein may reside in one or more of the processors 112, the I/O devices 114, the ASICs 115, or the memory 120.

In the following description, various techniques may be described in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media may include, but is not limited to, random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the computing device 110. Combinations of any of the above should also be included within the scope of computer readable media.

Moreover, the computer-readable media included in the system memory 120 can be any available media that can be accessed by the computing device 110, including removable computer storage media (e.g. CD-ROM 120A) or non-removeable storage media. Computer storage media may include both volatile and nonvolatile media implemented in any method or technology for storage of information such as computer-readable instructions, data structures, program modules, or other data. Generally, program modules executed on the computing device 110 may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

It will be appreciated that the computing device 110 is merely exemplary, and represents only one example of many possible computing devices and architectures that are suitable for use in accordance with the teachings of the present disclosure. Therefore, the computing device 110 shown in FIG. 1 is not intended to suggest any limitation as to scope of use or functionality of the computing device and/or its possible architectures. Neither should computing device 110 be interpreted as having any dependency or requirement relating to any one or combination of components illustrated in the example computing device 110.

Figure 2:
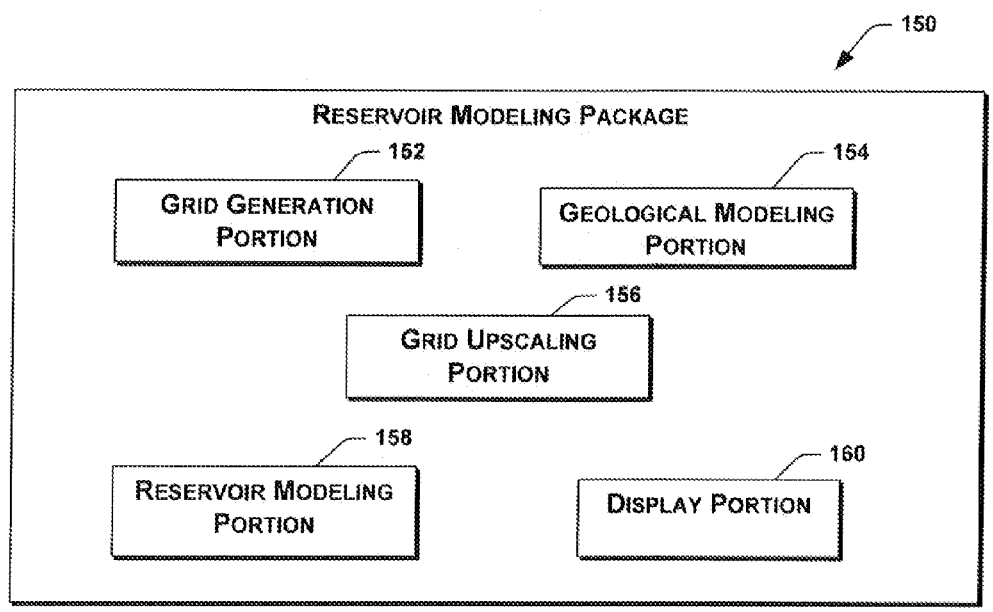
FIG. 2 is a schematic view of an exemplary reservoir modeling package in accordance with the teachings of the present disclosure.

FIG. 2 is a schematic view of the exemplary reservoir modeling package 150 of FIG. 1 in accordance with the teachings of the present disclosure. The reservoir modeling package 150 may be configured to develop reservoir simulation models that employ a coarsened or upscaled grid that is based on a relatively finer-scale grid developed for use with an underlying geological model. The details of various embodiments of such improved systems and methods for right sizing of reservoir models are described more fully below.

Figure 3:
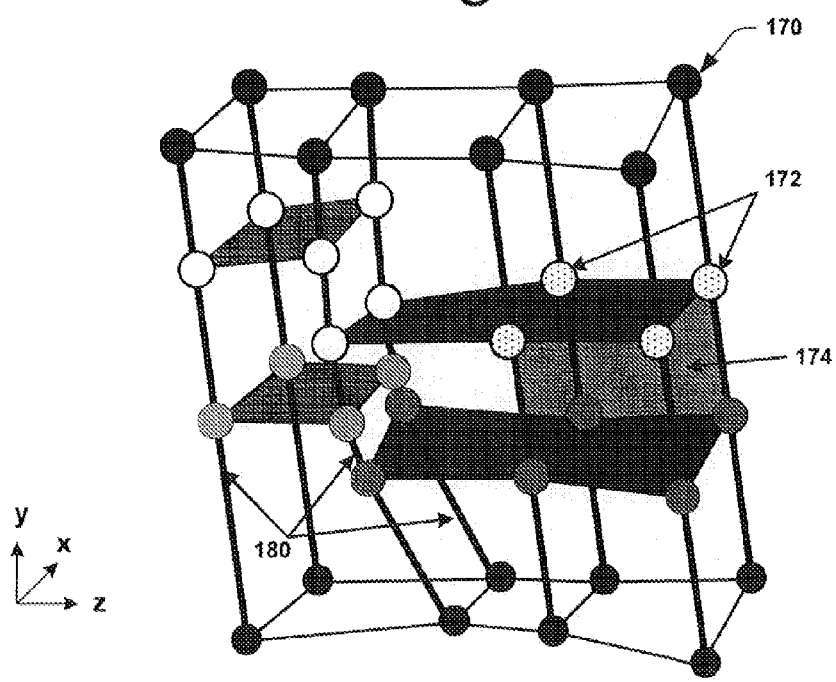
FIG. 3 is an isometric view of a portion of an exemplary grid model that may be generated by a grid generation portion of a reservoir modeling package in accordance with the teachings of the present disclosure.

As shown in FIG. 2, in some implementations, the reservoir modeling package 150 may include a grid generation portion 152, a geological modeling portion 154, a grid upscaling portion 156, a reservoir modeling portion 158, and a display portion 160. For illustrative purposes, a representative portion 170 of a three-dimensional grid generated by the grid generation portion 152 is shown in FIG. 3. Although a Cartesian coordinate axis system (x, y, z) is shown in FIG. 3, it should be appreciated that the cells in the grid need not be defined using a Cartesian system, and that in alternate embodiments, any suitable coordinate system for defining the cells of the grid may be used.

In general, unless otherwise stated herein, one or more of the components of the reservoir modeling package 150 depicted in FIG. 2 may be variously combined with one or more other components, or eliminated, to provide further possible embodiments of reservoir modeling packages in accordance with the teachings of the present disclosure. For example, in some embodiments, the grid generation portion 152 may be part of the geological modeling portion 154. Similarly, the display portion 160 may be part of the reservoir modeling portion 158, or the geological modeling portion 154, or any other portion of the reservoir modeling package 150. In further embodiments, either the grid generation portion 152, or the geological modeling portion 154, or both, may be separate from the reservoir modeling functionalities (i.e. eliminated from FIG. 2).

Also, it will be appreciated that, unless otherwise stated herein, one or more of the components of the reservoir modeling package 150 depicted in FIG. 2 may include (or be composed of) conventional components. For example, in some implementations, the geological modeling portion 154 may be a software package known as Petrel®, which is a software package commercially-available from Schlumberger Technology Corporation. Similarly, in some implementations, the grid generation portion 152 may be a grid generation package known as Flogrid®, or Petragrid, also available from Schlumberger. In some embodiments, the reservoir modeling portion 158 may be a conventional software package known as Eclips®, which is another software package commercially-available from Schlumberger Technology Corporation. Unless otherwise specified, other conventional software tools may also be used in the reservoir modeling package 150, including those simulation, modeling, and display tools available from or produced by, for example, Gemini Solutions, Inc., BP, Chevron, Roxar, Texas A&M University, and any other suitable tools.

The preparation of fine-scale grids using the grid generation portion 152, and the geological modeling using the geological modeling portion 154, may be accomplished using generally known techniques and will not be described in detail herein. Similarly, the performance of reservoir simulations using the reservoir modeling portion 158, and the display of simulation and modeling results using the display portion 160, may also be accomplished using generally known techniques, and therefore will not be described in detail herein. Such known techniques include, for example, those techniques described in the following references and incorporated herein by reference: "Petrel Version 2007.1—Petrel VR Configuration and User Guide," by Schlumberger Technology Corporation (2007); "Archiving Geological and Reservoir Simulation Models—A Consultation Document," UK Department of Trade and Industry, (2004); "Optimal Coarsening of 3D Reservoir Models for Flow Simulation," by King et al., SPE (Society of Petroleum Engineering) 95759 (October 2005); "Top-Down Reservoir Modeling," by Williams et al., SPE 89974 (September 2004); and U.S. Pat. No. 6,106,561 issued to Farmer and assigned to Schlumberger Technology Corporation.

Figure 4:
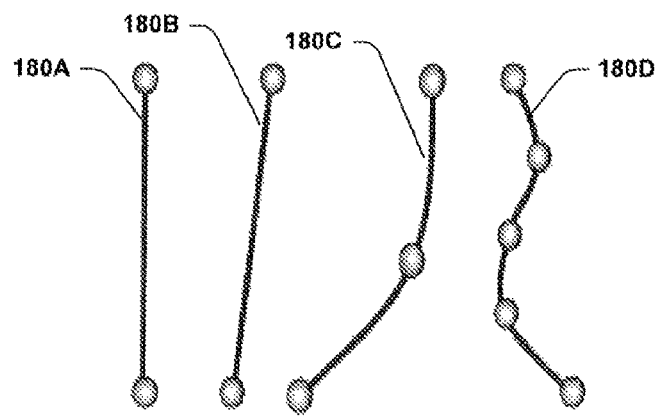
FIG. 4 shows exemplary types of grid pillars that may be encountered in techniques in accordance with the teachings of the present disclosure.

As noted above, FIG. 3 is an isometric view of a portion of an exemplary grid model 170 that may be generated by the grid generation portion 152 of the reservoir modeling package 150. In this embodiment, the exemplary grid model 170 includes a plurality of computational grid points (or nodes) 172 that cooperatively define a plurality of cells 174. In at least some embodiments, the nodes 172 are oriented in so-called "pillars" 180 that extend through the corners of the cells 174. More specifically, FIG. 4 shows several typical examples of grid pillars 180 that may be encountered in a computational grid, including a vertical pillar 180A, a straight pillar 180B, a listric pillar 180C characterized by three nodes, and a curved pillar 180D characterized by greater than three (e.g five) nodes. In alternate embodiments, other types of pillars 180 or computational grids may be encountered.

In general, the grid pillars 180 of a relatively fine scale geological model may be configured to honor the geology that is being modeled very well. In at least some embodiments, the pillars 180 produce cornerpoint grids with cells 174 (e.g. 6-sided boxes) that may be configured to fit the defined faults and reservoir boundaries. For reservoir simulation this can sometimes be a problem since, in a finite difference code, the relative volumes of neighboring cells 174 can cause significant numerical problems. Also, it may be desirable to refine a grid for finite difference simulation to accommodate an expected flow. In some implementations, there may be areas where a pressure field varies relatively slowly (e.g. wherein the pressure field is only described at the centers of the cells 174), and in such implementations, there may be a huge benefit (in terms of CPU time) to having a coarse representation.

In at least some conventional coarsening processes, if the spacing of the grid is changed, the process may rebuild the whole grid, starting from the initial goal of a pillar grid—honoring the faults present within the geological structure being modeled. In many cases, such coarsening processes may result in one or more of the pillars being moved or adjusted, so that the coarse grid is not a true subdivision of the fine grid. In other words, the nodes of the coarsened grid are not directly comparable on a node-by-node basis with corresponding nodes of the fine grid. Since the fine grid is not a higher-order representation of the problem being solved on the coarse grid, the comparison of simulation results (e.g. flow characteristics) on a coarse grid versus flow on the underlying fine grid is only approximate at best.

Figure 5:
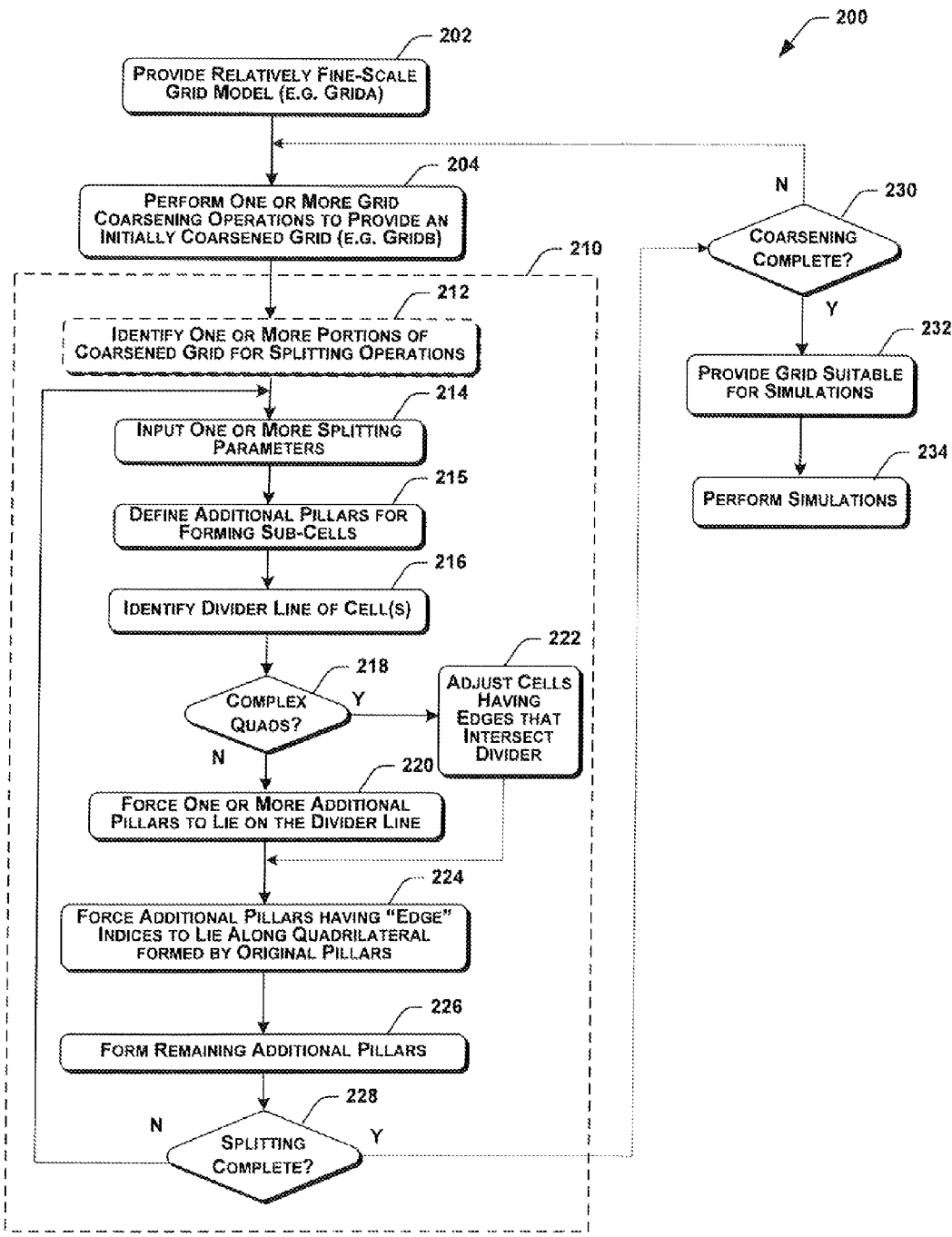
FIG. 5 is a flowchart of an embodiment of an exemplary process in accordance with the teachings of the present disclosure.

Embodiments of systems and methods in accordance with the teachings of the present disclosure may mitigate the above-referenced undesirable aspects of conventional grid coarsening techniques. For example, FIG. 5 is a flowchart of an embodiment of an exemplary process 200 in accordance with the teachings of the present disclosure. The process 200 may be performed by the reservoir modeling package 150. In some embodiments, the process 200 includes providing a relatively fine scale grid model (e.g. GridA) at 202. The provision of the relatively fine scale grid model (at 202) may include, for example, generating and populating a grid model using a conventional grid generation tool (e.g. Flogrid®, Petragrid, etc.), or inputting a pre-existing or previously-created model. In some implementations, the cells of the fine scale grid model provided at 202 may be sized for use with a geological model (e.g. 25 m×25 m×0.5 m, 25 m×25 m×6", etc.) of the desired volume.

Figure 6:
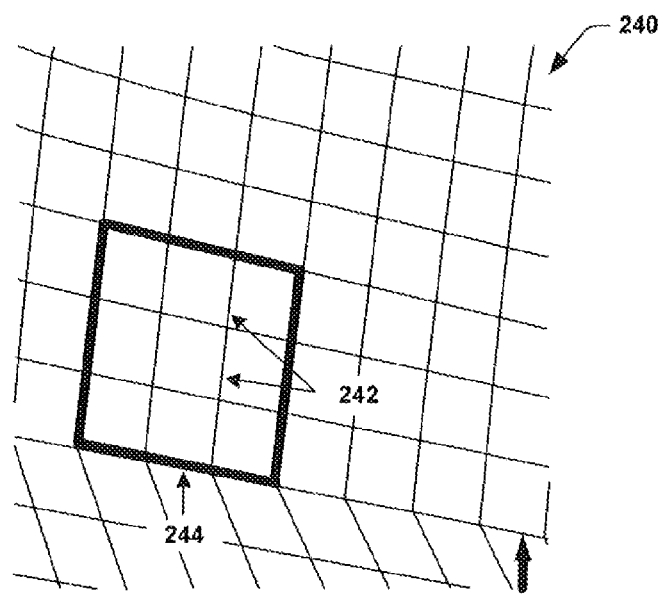
FIG. 6 is an elevational view of a representative example of a coarsening operation in accordance with the teachings of the present disclosure.

At 204, one or more grid coarsening operations may be performed on the fine scale grid model to provide a coarsened grid (e.g. GridB). For example, FIG. 6 shows a representative example of a coarsening operation (or areal coarsening operation) within a two-dimensional sheet of grid points 240 that may be performed as part of the coarsening operations (at 204). In this example, a plurality of fine grid cells 242 (nine in this example) are areally coarsened into a single coarse grid cell 244. Of course, in alternate implementations, any other number of fine grid cells 242 may be areally coarsened into a single coarse grid cell 244. Additional details for performing grid coarsening operations are described, for example, in the previously-incorporated U.S. Patent Application No. {t.b.d.} entitled "Right Sizing Reservoir Models" filed concurrently herewith on Mar. 6, 2009 . As noted above, the coarsened grid may include one or more coarsened grid cells that may be defined by one or more complex quadrilaterals (i.e. "self-intersecting" or "inside-out" cells).

The process 200 enters a splitting sub-process at 210. More specifically, in the embodiment shown in FIG. 5, one or more portions of the coarsened grid are identified for splitting operations at 212. In some implementations, the entire coarsened grid (e.g. GridB) may be identified for splitting operations (at 212), while in other implementations, only desired portions of the coarsened grid (e.g. along faults, boundaries, etc.) are identified.

At 214, one or more splitting input parameters are received. The splitting input parameters may, for example, be read from memory, or may be interactively entered by a user. The one or more splitting input parameters are used by the process 200 to sub-divide quadrilaterals defined by each set of grid pillars 180 that define the cells 174. In some implementations, the one or more splitting input parameters may be defined by two numbers, one for splitting in an "I" direction (or "ISplit"), and another for splitting in a "J" direction (or "JSplit"). For example, for a case in which ISplit=3 and JSplit=8, each quadrilateral defined by a set of grid pillars 180 that define the cells 174 is split (or sub-divided) into twenty-four smaller quadrilaterals (or sub-cells) (i.e., ISplit×JSplit=24).

Figure 7:
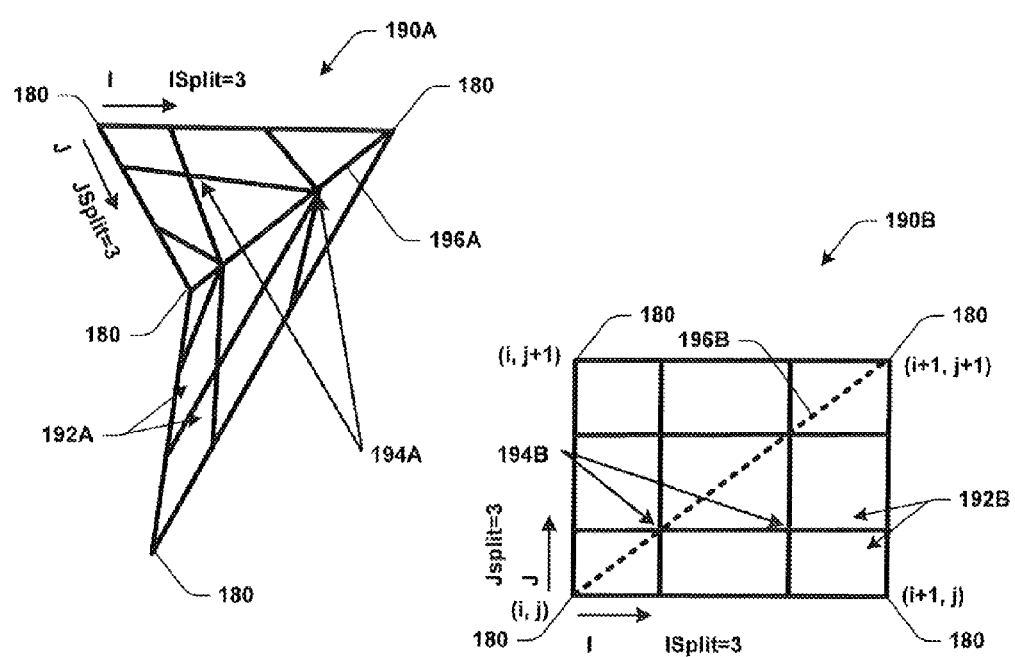
FIG. 7 shows exemplary quadrilaterals (or quadrilateral cells) formed by grid pillars in accordance with the teachings of the present disclosure.

Alternately, in some implementations, a single parameter may be used for splitting in both the "I" direction and the "J" direction. For example, FIG. 7 shows an exemplary splitting operation for two differently-shaped quadrilaterals 190A, 190B defined by grid pillars 180 wherein a single splitting parameter is employed (ISplit =JSplit =3). More specifically, an irregular quadrilateral 190A (left side of FIG. 7) is split into nine smaller quadrilaterals 192A with additional grid pillars 194A (in this case four) being inserted within the irregular quadrilateral 192A. As to the example of FIG. 7, to identify the nine smaller quadrilaterals (two labeled 192A), ignore the divider line labeled 196A and consider the four additional internal grid pillars (two having positions labeled at nodes 194A) and an additional eight grid pillars (e.g., due to ISpilt =JSplit =3) each having a position along one of the edge lines connecting the four original grid pillars (labeled 180) that form the irregular quadrilateral 190A. Similarly, a regular quadrilateral 190B (right side of FIG. 7) is split into nine smaller quadrilaterals (two labeled 192B, to identify, ignore the divider line 196B) with four additional grid pillars (two internal having respective positions labeled at nodes 194B) being inserted within the regular quadrilateral 192B and eight additional grid pillars (e.g, due to ISplit =JSplit =3) each having a position along one of the edge lines connecting the four original grid pillars (labeled 180). As depicted in FIG. 7, the "I" and "J" coordinate directions may or may not be orthogonal.

With continued reference to FIG. 5, the splitting sub-process 210 includes, for each cell subject to the splitting sub-process 210, defining a plurality of additional pillars for splitting the cells into a plurality of sub-cells at 215. As noted above, the number of sub-cells within each cell may be determined by the splitting input parameters received at 214 (i.e. number of sub-cells=ISplit×JSplit).

At 216, for each cell subject to the splitting sub-process 210, a "divider" (or "dividing") line of the cell is identified. For example, as shown in FIG. 7, the quadrilateral cell 190B subject to the splitting sub-process 210 is generally defined by four grid pillars 180 (or more specifically, the top nodes of four grid pillars 180) having the following indices: (i, j), (i+1, j), (i, j+1), and (i+1, j+1). The identifying of the divider line at 216 analyzes the lengths of the "diagonals" across the cells 190 (i.e. distance from (i,j) to (i+1,j+1) and distance from (i+1,j) to (i,j+1)), and selects a shorter of the two lines (if there is one) as the divider line (e.g. divider line 196A in FIG. 7), or simply elects one of the diagonals as the divider line if the two diagonals are of equal length (e.g. divider line 196B in FIG. 7).

Referring again to FIG. 5, after the divider lines are identified at 216, the splitting sub-process 210 determines whether complex quadrilaterals (or complex sub-cells) will be formed during subsequent splitting operations at 218. The determining at 218 may include determining whether the one or more splitting parameters have a single value. More specifically, the determination (at 218) concludes that complex quadrilaterals will not be formed during subsequent splitting operations when ISplit=JSplit. When ISplit≠JSplit, however, complex quadrilaterals (e.g. rectangular, convex, etc.) are determined at 218 to be formed (or possible to be formed).

If complex quadrilaterals will not be formed (at 218), then at 220, then one or more of the newly-added additional pillars at 215 (e.g. additional pillars 194 of FIG. 7) are forced to lie on the divider line (e.g. dividing line(s) 196 of FIG. 7) to form "divider" pillars. In some implementations, the additional pillars that are forced to lie on the divider line are those that would lie on the divider line in the case of a square cell.

Alternately, if complex quadrilaterals will (or may) be formed (at 218), then at 222, an adjustment of the sub-cells having edges that intersect the divider is performed. More specifically, the adjustment (at 222) may include calculating a distance along a relevant co-ordinate line from the corner points (i.e. from the additional pillars 194) of the intersecting sub-cell to the divider line, determining which corner point is closest to the divider line (or would need to move the least distance to coincide with the divider line), and then moving that nearest corner point onto the divider line to form the one or more "divider" pillars. The adjustments (at 222) may advantageously prevent "inside-out" sub-cells, and may advantageously reduce or minimize a ratio of volumes between adjacent cells.

As further shown in FIG. 5, at 224 the additional pillars 194 having "edge" indices (*, 0), (0, *), (ISplit, *), and (*, JSplit) are each forced to have a position that lies along one of the edges of the original quadrilateral formed along lines extending between the original pillars 180 of the grid model (where * =0, 1, 2, etc. indexed from the coarse grid's corner points). At 226, the remaining additional grid pillars 194 are formed at the intersections of the lines extending between the edge pillars (defined at 224) and the divider pillars formed along the divider line (defined at 220 or 222).

At 228, a determination is made whether splitting operations are complete. If one or more grid portions designated for splitting (identified at 212) have not yet undergone splitting operations, the splitting sub-process 210 returns to 214, and repeats operations 214 through 228 until all desired portions have undergone splitting operations.

Upon determining (at 228) that splitting operations are complete, the process 200 determines whether all grid coarsening operations are complete at 230. Any suitable methods for determining whether grid coarsening operations are complete may be employed. For example, in some implementations, the determination of whether splitting operations are complete may include successively upscaling (and/or resampling) properties from the fine scale grid model (or the previous version of the coarsened grid model) to the most recent version of the grid model, and comparing one or more flow-field or geological characteristics of the upscaled grid model to corresponding characteristics of the fine scale grid model until an unacceptable divergence or "drifting away" is observed. For example, in some implementations, a vertical permeability Kv is calculated from a geological permeability ratio concept (vertical permeability Kv over horizontal permeability Kh). Other variables or characteristics which may be calculated include, for example, hydrocarbon in place, sand (or facies), NetGross fraction, rock type classes/fractions, Kv, dynamic properties, or any other suitable variables. Techniques for determining whether grid coarsening operations are complete at 230 are described more fully in the previously-incorporated U.S. Patent Application No. {t.b.d.} entitled "Right Sizing Reservoir Models" filed concurrently herewith on Mar. 6, 2009. Of course, other suitable quantitative or qualitative techniques for determining whether grid coarsening operations are complete may be used.

If grid coarsening operations are not complete (at 230), the process 200 returns to 204 and repeats the above-described coarsening and splitting operations 204 through 228. On the other hand, if the grid is determined to be sufficiently coarsened (at 230), the process 200 may provide the suitably coarsened grid for simulations at 232, and simulations may be performed (e.g. reservoir simulations, etc.) at 234.

It will be appreciated that methods and systems in accordance with the teachings of the present disclosure may provide considerable advantages. At least some of these advantages may best be understood after a brief review of some undesirable aspects that may be encountered using conventional processes.

For example, in at least some conventional processes, a boundary condition along a reservoir boundary (e.g. no-flow or aquifer pressure support) in a reservoir simulation program may be applied only after (or while) a fluid-flow simulation of the reservoir is being performed. In such cases, the boundary condition (e.g. no movement of the base or sides in a geomechanical simulator) may need to be applied "at a distance,"

causing possible errors or simulation failures using conventional pillar gridding techniques. More specifically, a conventional reservoir pillar grid may require only the reservoir flow boundary to be honored, and so pillars beyond the boundary are typically undefined and may be anywhere in space (including inside the defined reservoir)—these pillars cannot be trivially re-defined. Also, if a new reservoir boundary is generated "at a distance" and a conventional pillar gridding algorithm is applied, all pillars may be generated, and therefore, pillars in the original reservoir model cannot be guaranteed to stay in the same place. This may be a consequence of gridding to the geology without consideration of the pre-existing reservoir grid.

Embodiments of systems and methods in accordance with the present disclosure may at least partially mitigate the undesirable aspects of conventional methods. For example, techniques in accordance with the present disclosure may ensure that grid pillars are not trivially defined, and may reduce or eliminate possible occurrences of so-called "self-intersecting" or "inside-out" cells that may cause simulation errors or failures. Furthermore, techniques in accordance with the present disclosure may automatically prevent the occurrence of inside-out cells, thereby reducing or eliminating expensive manual activities that were required for identification and removal of inside-out cells using conventional processes.

In addition, embodiments of systems and methods in accordance with the present disclosure may force pillar grids at cell corners to remain fixed, ensuring that the resulting coarsened grid will be comparable to the underlying fine grid on a node-by-node basis. Thus, embodiments in accordance with the present disclosure may greatly facilitate comparison of simulation results on a coarse grid versus on the underlying fine grid.

It will be appreciated that, in at least some implementations, methods and systems in accordance with the teachings of the present disclosure may be used to configure a grid model for being subsequently embedded within a larger grid, such as for geomechanics simulations. In such implementations, the grid that is to be embedded may be suitable for reservoir simulations, but may desirably be relatively densely populated (all I,J pillars defined) so that it can be suitably embedded within a larger, relatively fine scale grid (e.g. for geomechanics simulations). The reservoir simulation grid, however, may desirably need to remain unchanged (or unmoved, or unadjusted) in this new grid, however, so that a coupled geomechanics-flow simulation may be directly comparable to the flow-alone simulation.

Figure 8:
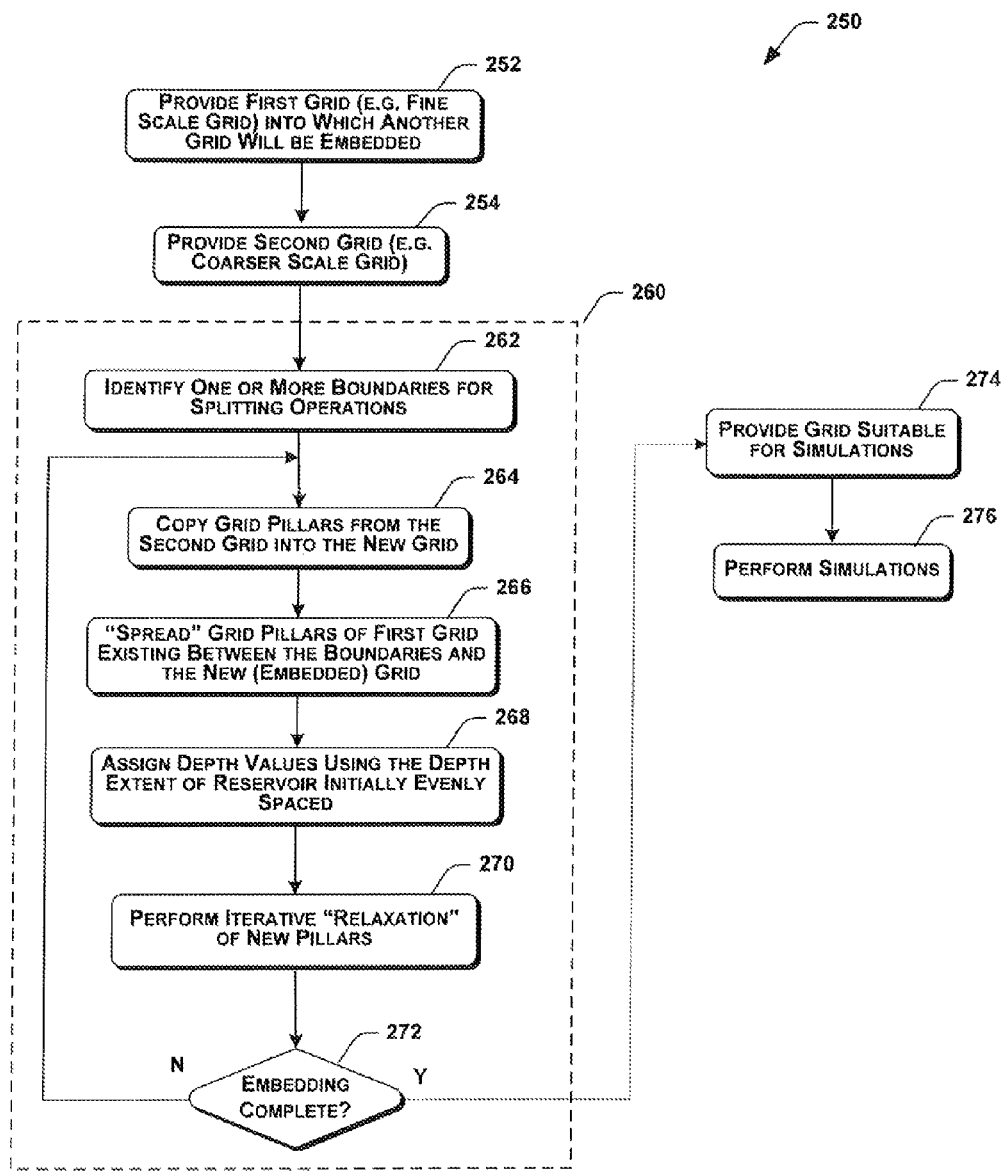
FIG. 8 is a flowchart of another embodiment of a process in accordance with the teachings of the present disclosure.

For example, FIG. 8 is a flowchart of another embodiment of an exemplary process 250 in accordance with the teachings of the present disclosure. In some implementations, the process 250 may be performed by the reservoir modeling package 150. It will be appreciated that many of the operations involved in the process 250 may be substantially similar to those described above respect to the process 200 shown in FIG. 5, and therefore, only a brief description of such operations will be provided below for the sake of brevity.

As shown in FIG. 8, in some implementations, the process 250 includes providing a first grid into which another grid will be embedded at 252. For example, the first grid may be a relatively fine scale grid model (e.g. GridA) suitable for geological simulations. In some implementations, the providing of the first grid (at 252) may include accessing or receiving a pre-existing grid, or generating a wholly new grid.

Similarly, at 254, a second grid is provided. In some implementations, the second grid may be a relatively coarse scale grid model suitable for performing reservoir simulations. The providing of the second grid (at 254) may include accessing or receiving a pre-existing grid, or generating a wholly new grid.

Figure 9:
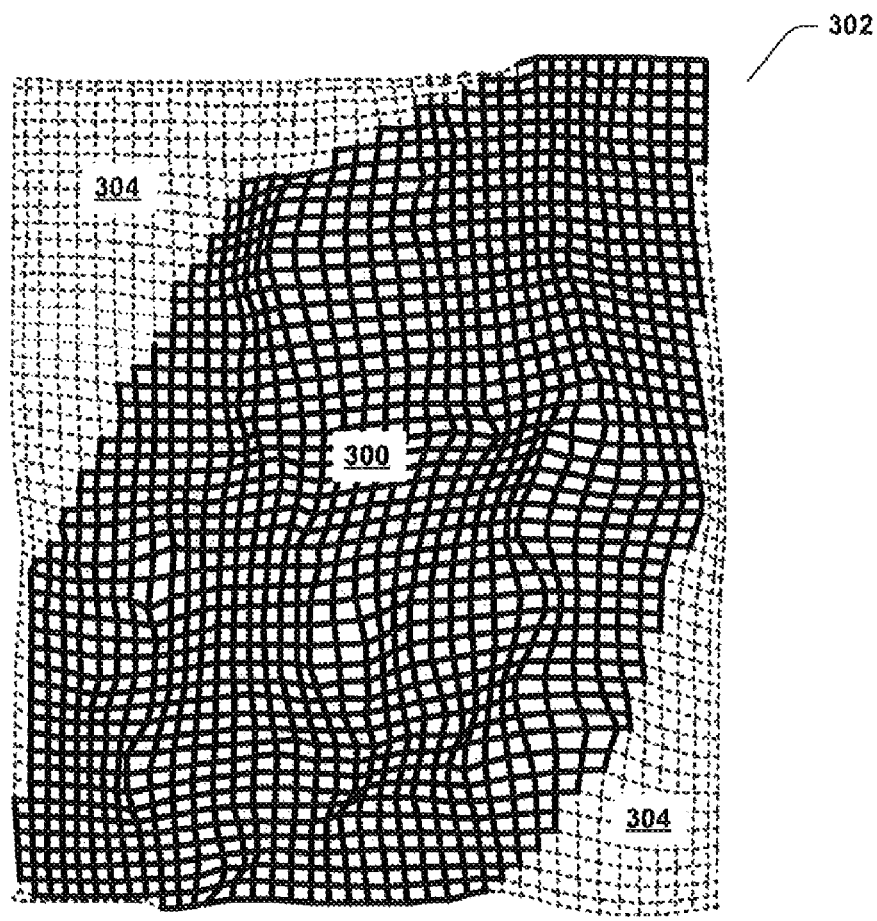
FIG. 9 shows an elevational view of an exemplary reservoir simulation grid during an embedding process in accordance with the teachings of the present disclosure.

The process 250 enters an embedding sub-process at 260. More specifically, at 262, one or more boundaries of the second grid are identified for splitting operations. The one or more boundaries may lie outside of the interface(s) between the second grid and the first grid when the second grid becomes embedded in the first grid. For example, FIG. 9 shows an elevational view of an exemplary reservoir simulation grid 300 (light colored) surrounded by an approximately rectangular boundary 302. The one or more boundaries may (or may not) have square or rectangular edges. In some implementations, the boundaries are interactively identified by a user, while in other implementations, the boundaries may be automatically or semi-automatically identified.

At 264, the grid pillars from the second grid are copied into a new (or embedded) grid (e.g. at the new location embedded within the first grid). At 266, the grid pillars from the first grid that exist between the one or more boundaries (defined at 262) and the second grid (defined at 254) are spread (or coarsened) using one or more of the operations described above with respect to the process 200 shown in FIG. 5. More specifically, in some implementations, the spreading (at 266) of the grid pillars between the boundaries and the new (or embedded) grid includes one or more aspects of the splitting sub-process 210 described above and shown in FIG. 5. Depth values (for a complete cornerpoint problem) are assigned to the added grid pillars (at 266) by using a depth extent of the reservoir initially evenly spaced at 268.

With continued reference to FIG. 8, at 270, an iterative "relaxation" of the new pillars is performed. In some implementations, the relaxation (at 270) may be performed by taking a 5-point stencil (i.e. a pillar and its four nearest neighbors in I and J). In alternate implementations, a 9-point stencil may be used that incorporates the members of the 5-point stencil as well as diagonal neighbors. Within the 5-point stencil, the (x,y) location of the pillar is "relaxed" by moving the pillar to the mean of the neighbors (i.e. centered), and the corner-point depths are similarly adjusted.

FIG. 9 shows a representative example of iteratively relaxed pillars 304 disposed proximate one or more portions of the embedded reservoir grid 300. Note that for the corners, the (x,y) location is fixed and also that for pillars from the pre-existing grid all properties (x,y,z) are fixed. The iterative relaxation at 270 may be performed any suitable number of iterations (e.g. 5 iterations) and may result in the layer thicknesses being dominated by the layer thicknesses at the reservoir boundary, and the new pillar positions being defined by the requested corners and the existing reservoir grid, thereby leading to similar volumes in neighboring cells.

As further shown in FIG. 8, a determination is performed at 272 to determine whether the process of embedding the second grid within the first grid is complete. If not, the embedding sub-process 260 may repeat one or more portions of the embedding sub-process 260 (e.g. operations 264 through 272) until embedding operations are complete. Once embedding is complete, the process 250 may provide a combined (or embedded) grid suitable for performing simulations at 274. Simulations (e.g. combined geomechanical and reservoir simulations) may be performed at 276.

As described more fully above, embodiments of grid embedding systems and methods in accordance with the present disclosure may advantageously reduce or eliminate possible occurrences of "self-intersecting" or "inside-out" cells, and may provide coarsened grid models wherein reservoir-only simulation results may be compared with geomechanics-reservoir simulation results on a node-by-node basis. Similarly, grid embedding systems and methods may advantageously encourage similar volumes in neighboring cells along interface boundaries between an embedded reservoir simulation grid and a surrounding geological modeling grid. Thus, embodiments in accordance with the present disclosure may decrease costs associated with performing simulations, may greatly facilitate comparison of simulation results on a coarse grid versus on the underlying fine grid, and may improve simulation accuracies by reducing cell volume ratios between neighboring cells.

Although embodiments of systems and methods in accordance with the teachings of the present disclosure have been described in language specific to structural features and/or methods, it is to be understood that the subject of the appended claims is not necessarily limited to the specific features or methods described. Rather, the specific features and methods are disclosed as exemplary implementations of integrating data-driven modeling and knowledge into a self-improving reasoning tool.

What is claimed is:

1. A method, comprising:
providing a grid having a plurality of grid pillars;
performing one or more splitting operations on at least a portion of the grid to increase a grid density within the portion of the grid, the plurality of grid pillars within the portion of the grid being forced to remain fixed in position during the one or more splitting operations, wherein performing one or more splitting operations on at least a portion of the grid comprises:
splitting a quadrilateral cell defined by edge lines extending between four grid pillars of the plurality of grid pillars into a plurality of sub-cells using one or more splitting parameters,
identifying a divider line as a shortest length dividing line or one of equal length dividing lines wherein the divider line divides the quadrilateral cell and extends between two of the four grid pillars, and
defining additional grid pillars for the plurality of sub-cells, each of the additional grid pillars having a position along one of the edge lines or having a position along the divider line; and
performing a computer simulation of fluid flow in a reservoir using the at least a portion of the grid that comprises an increase in grid density.

2. The method of claim 1, wherein defining additional grid pillars having a position along one of the edge lines comprises:
forcing additional grid pillars having edge indices that include at least one of (*, 0), (0, *), (ISplit, *), and (*, JSplit), to each have a position along one of the edge lines of the quadrilateral cell, wherein * denotes an integer value within a range from 0 to ISplit or from 0 to JSplit, inclusive.

3. The method of claim 1, wherein defining additional pillars includes:
determining whether complex quadrilaterals are formed by the one or more splitting parameters;
when complex quadrilaterals will not be formed, forcing one or more additional pillars to have a position that lies on the divider line;
otherwise, adjusting one or more additional grid pillars of the sub-cells having edges that intersect the divider line of each cell.

4. The method of claim 1, further comprising:
determining whether the one or more splitting operations are complete; and
when the one or more splitting operations are determined to be complete, performing the computer simulation.

5. The method of claim 4, wherein determining whether grid adjusting operations are complete includes:
assessing whether one or more characteristics have unacceptably diverged from one or more corresponding characteristics of the provided grid.

6. The method of claim 4, further comprising:
comparing one or more simulation results from repeatedly performing the computer simulation computed using the grid having an increase in a grid density within the portion of the grid with one or more corresponding simulation results computed using the provided grid on a node-by-node basis.

7. The method of claim 1 wherein the providing comprises providing a grid wherein one or more of the plurality of grid pillars define a fault boundary within a geological structure.

8. A method, comprising:
providing a grid having a plurality of grid pillars;
identifying one or more splitting parameters for splitting one or more cells formed by the plurality of grid pillars into a plurality of sub-cells;
identifying a divider line for each of the one or more cells as a shortest length dividing line or one of equal length dividing lines wherein the divider line divides a cell by extending between two of the grid pillars that define the cell;
defining a plurality of additional pillars by splitting the one or more cells into a plurality of sub-cells using the one or more splitting parameters;
determining whether complex quadrilaterals are formed by the one or more splitting parameters;
when complex quadrilaterals will not be formed, forcing one or more additional pillars to each have a position that lies on the divider line;
otherwise, adjusting one or more additional grid pillars of the sub-cells having edges that intersect the divider line of each cell;
forcing additional grid pillars having edge indices to each have a position that lies along one edge of edges of quadrilaterals formed by the provided grid pillars;
forming remaining additional pillars based on additional grid pillars having either a position along one of the edges or having a position along one of the divider lines of the quadrilaterals formed by the provided grid pillars; and
performing a computer simulation of fluid flow in a reservoir using a grid defined by nodes of the grid pillars and nodes of the additional grid pillars.

9. The method of claim 8, wherein providing a grid having a plurality of grid pillars includes:
at least one of generating the grid using a grid generation program or receiving a pre-existing grid.

10. The method of claim 8, wherein identifying one or more splitting parameters for splitting one or more cells formed by the plurality of grid pillars into a plurality of sub-cells includes:
at least one of receiving one or more splitting parameters from a memory or receiving one or more splitting parameters interactively from a user.

11. The method of claim 8, wherein determining whether complex quadrilaterals are formed by the one or more splitting parameters includes:
determining whether the one or more splitting parameters have a single value.

12. The method of claim 8, wherein forcing one or more additional pillars to lie on the divider line includes:

forcing one or more additional pillars to each have a position that lies on the divider line that would have a position that lies on the divider line of a square cell.

13. The method of claim 8, wherein adjusting one or more additional grid pillars of the sub-cells having edges that intersect the divider line of each cell includes:
   calculating a distance along a relevant co-ordinate line from corner points of the intersecting sub-cell to the divider line;
   determining which corner point is closest to the divider line; and
   moving the nearest corner point onto the divider line.

14. The method of claim 8, wherein forcing additional grid pillars having edge indices to each have a position that lies along one of the edges includes:
   forcing additional grid pillars having edge indices that include at least one of (*, 0), (0, *), (ISplit, *), and (*, JSplit), to each have a position that lies along one of the edges of the quadrilaterals formed by the provided grid pillars, wherein * denotes an integer value within a range from 0 to ISplit or from 0 to JSplit, inclusive.

15. The method of claim 8 wherein the providing comprises providing a grid wherein one or more of the plurality of grid pillars define a fault boundary within a geological structure.

16. One or more computer-readable storage media containing computer-readable instructions that, when executed, perform a method of embedding a second grid within a first grid, the method comprising:
   embedding the second grid into a desired position within the first grid;
   identifying one or more boundaries surrounding the embedded second grid for performing one or more splitting operations; and
   performing one or more splitting operations on a plurality of grid pillars of the first grid that exist between the one or more boundaries and the embedded second grid, the plurality of grid pillars being subject to the one or more splitting operations being forced to remain fixed in position during the one or more splitting operations, wherein performing one or more splitting operations comprises:
      splitting a quadrilateral cell defined by edge lines extending between four grid pillars of the plurality of grid pillars into a plurality of sub-cells using one or more splitting parameters,
      identifying a divider line as a shortest length dividing line or one of equal length dividing lines wherein the divider line divides the quadrilateral cell and extends between two of the four grid pillars, and
      defining additional grid pillars for the plurality of sub-cells, each of the additional grid pillars having a position along one of the edge lines or having a position along the divider line.

17. The one or more computer-readable storage media of claim 16, wherein performing one or more splitting operations further includes:
   determining whether complex quadrilaterals are formed by the one or more splitting parameters;
   when complex quadrilaterals will not be formed, forcing one or more additional pillars to each have a position that lies on the divider line;
   otherwise, adjusting one or more additional grid pillars of the sub-cells having edges that intersect the divider line of each cell.

18. The one or more computer-readable storage media of claim 16, wherein performing one or more splitting operations further includes:
   assigning depth values to the additional grid pillars; and
   iteratively relaxing the additional grid pillars.

19. The one or more computer-readable storage media of claim 18, wherein iteratively relaxing the additional grid pillars includes:
   moving a location of each non-edge line grid pillar to a mean position based on positions of a plurality of neighboring grid pillars.

20. The method of claim 16 wherein one or more of the plurality of grid pillars of the first grid define a fault boundary within a geological structure.

* * * * *